Jan. 4, 1949.         E. J. CARLETON         2,458,343
                        ROTARY SEAL
Filed June 18, 1945                    2 Sheets-Sheet 1
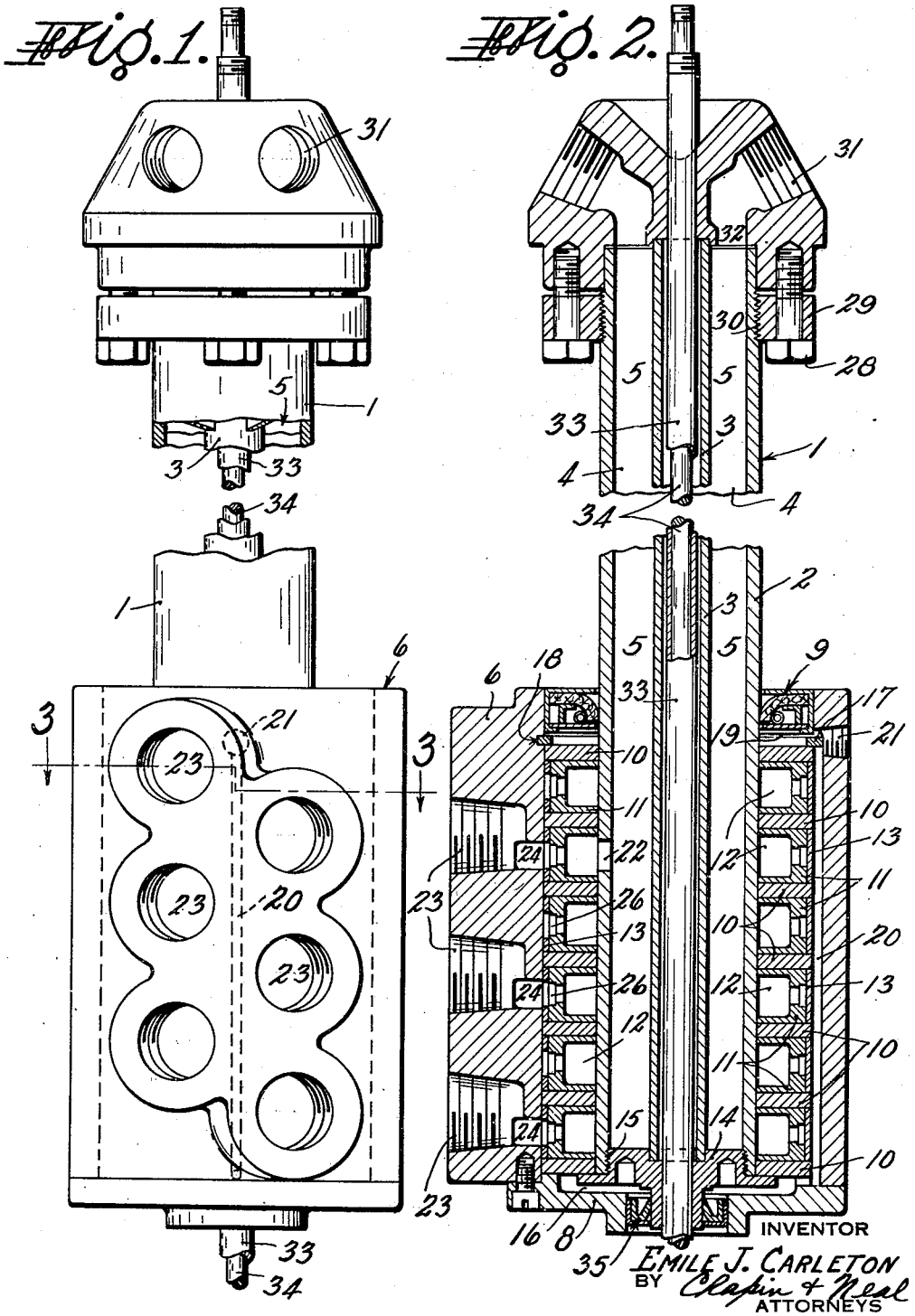
INVENTOR
EMILE J. CARLETON
BY
ATTORNEYS Jan. 4, 1949.  E. J. CARLETON  2,458,343
ROTARY SEAL
Filed June 18, 1945  2 Sheets-Sheet 2
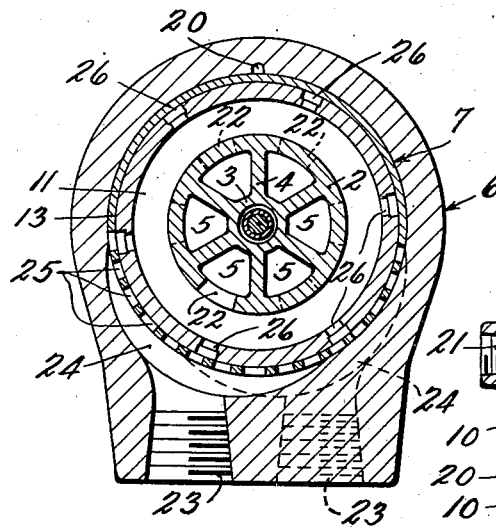
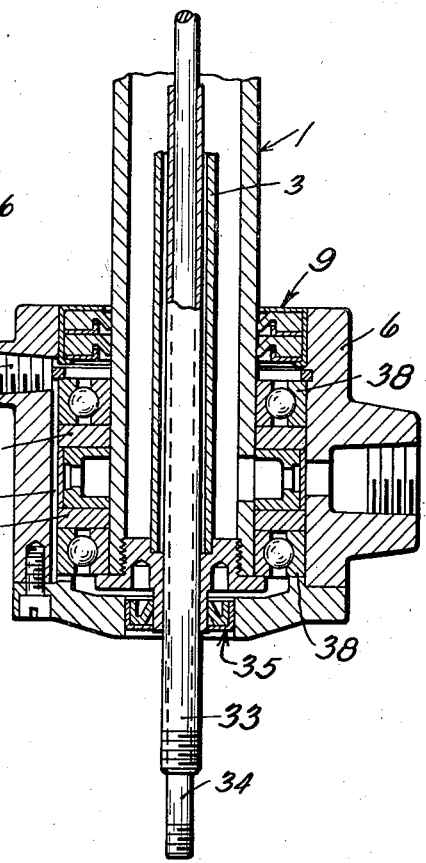
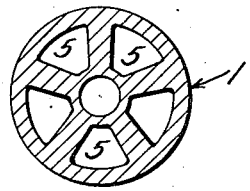
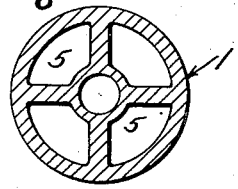
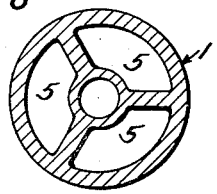
INVENTOR
EMILE J. CARLETON
BY Chapin + Neal
ATTORNEYS Patented Jan. 4, 1949

2,458,343

UNITED STATES PATENT OFFICE 2,458,343

ROTARY SEAL

Emile J. Carleton, Holyoke, Mass., assignor to Hydraulic Engineering Co. Inc., Holyoke, Mass., a corporation of Massachusetts Application June 18, 1945, Serial No. 600,037

5 Claims. (Cl. 285—97.3)

This invention relates to rotary seal devices of the type permitting fluids under pressure to be conducted from a stationary supply through a rotatable shaft to a turntable or other rotating member or element.

Among the objects of the invention is the provision of an improved sealing and bearing structure of the above type which can be maintained with a minimum of attention and expense and which permits the association of mechanical controls therewith.

Other and further objects residing in the details of construction will be made apparent in the following specification and claims.

In the accompanying drawings:

Fig. 1 is an elevational view, parts being broken away;

Fig. 2 is a vertical sectional view;

Fig. 3 is a sectional view substantially on line 3—3 of Fig. 1;

Fig. 4 is a vertical sectional view showing a modification; and

Figs. 5, 6 and 7 are transverse sectional views showing modified arrangements of the passages in the main shaft.

Referring to the drawings the main shaft, generally indicated at 1, comprises an outer tube 2 and a concentric inner tube 3, the two tubes being connected by a plurality of longitudinal radially arranged wall members 4, providing a plurality of conduits 5 extending lengthwise of the shaft.

The lower end of the shaft is swiveled in a casing generally indicated at 6. The casing is shown provided with a cylindrical bore 7 closed at the lower end by a cap 8, the end of the bore through which the shaft extends being closed by any suitable type of packing ring structure as generally indicated at 9. Between the wall of the bore and the shaft are positioned a plurality of spaced solid annular bearing members 10, preferably press fitted in the bore or otherwise held stationary with the casing. Between members 10 are positioned annular channel members 11 the channels 12 of which open toward the shaft. Between the web portions of the channel members and the wall of the bore are positioned relatively thin bearing rings 13 preferably press fitted in the bore between the bearing members 10. The channel members 11 are preferably press fitted on the shaft or otherwise held to the shaft to turn therewith.

The lower end of shaft 1 is closed by a plug 14 threaded at 15 into the end of the shaft. Plug 14 is spaced from the cap 8 sufficiently to provide a shallow chamber 16 open to the lower end face of the lowermost bearing member 10. Outwardly of the upper end face of the uppermost bearing member 10 a snap ring 17 fits in a groove 18 in the wall of bore 7, a shallow chamber 19 being thus provided between the packing 9 and the upper end face of the uppermost bearing member. The end chambers 16 and 19 are connected by a drain passage 20 which connects with a drain opening 21 formed in the casing. Preferably passage 20 is in the form of a groove cut in the bore wall so that it opens to the mating faces of the adjacent bearing and channel members.

Openings 22 are formed in the outer cylindrical wall 2 of the shaft 1, one from each conduit 5 to one of the channels 12.

The casing 6 is provided with a plurality of openings 23 positioned one in radial alignment with each of the channels 12, and suitable openings are provided through the bearing rings 13 and the webs of the channel members so that each opening 23 is in constant communication with its respective conduit 5 in all positions of rotation of the shaft 1. In the form illustrated the wall of the bore 7 is grooved adjacent each opening 23 to form an arcuate chamber 24. As best shown in Fig. 3 each bearing ring 13 is provided, over the extent of the adjacent arcuate chamber 24 with a plurality of openings 25 and the web of the corresponding channel member 11 is provided with openings 26, one of which is always in communication with one or more of the openings 25 of the adjacent bearing ring.

The upper end of shaft 1 is provided with a suitable distributor cap 27. As shown, cap 27 is bolted at 28 to a ring 29 threaded to the shaft at 30. Cap 27 is provided with a plurality of openings 31, one for each of the conduits 5. Cap 27 is also provided with an axial opening 32 in alignment with the inner tube 3 of the shaft.

As will be evident with casing 6 mounted on a base member, a constant supply of fluid pressure can be supplied to a member rotating with shaft 1, such as the turntable of a power shovel or the like. A circulation of oil may be furnished the rotating member by using one conduit 5 for the supply line and a second conduit for the return line. Mechanical control may also be furnished between the turning member and the base by way of rod members 33 and 34 which are mounted for either or both slidable and rotatable movement within the tube 3 of the shaft, the rods 33 and 34 passing through a packing 35 in cap 8. The rods 33 and 34 may have either rotative or sliding movement, or both, relative to the shaft and to each other.

My construction makes possible a very simple bearing structure which combines with it a constant fluid supply while avoiding complicated packing structures. The assembly of bearing members 10 secured to the bore of the casing, alternating with and having direct bearing contact with the shaft channel members 11 secured to the shaft and having bearing contact with rings 13 afford continuous radial bearing support throughout substantially the entire length of the shaft within the casing. At the same time the alternating bearing and channel members form mutual barriers to the escape of fluid, along their alternating bearing surfaces, longitudinally of the shaft. The substantial radial depth of the bearing and channel members which substantially increases the contacting surface areas further minimizes the tendency to leakage. By connecting the ends of the bearing assembly by the drain system 20—21, a conventional packing unit 9 (and 35 if rods 33 and 34 are used) adequately completes the seal.

As indicated in Figs. 5, 6, and 7 the conduits 5 provided in the shaft 1 may be varied in number and in size to meet needed requirements. Where only one or two conduits are provided in shaft 1 with a resulting decrease in the overall bearing surfaces in the casing 6, I preferably provide ball bearing units 38 at the ends of the casing as shown in Fig. 4 to increase the bearing support for the shaft in casing 6.

What I claim is:

1. A rotary seal device comprising a shaft having a fluid conduit extending longitudinally thereof, a casing having a bore within which one end of the shaft is rotatably mounted, spaced solid, annular bearing members secured to the wall of the bore, a relatively thin bearing ring secured to the wall of the bore between said members, an annular channeled member secured to the shaft with its channel opening toward the shaft and positioned to rotate between said bearing members, the radially inner face of the bearing member and the radially outer face of the channel member being in bearing contact with the shaft and said bearing ring respectively, an opening through the casing in substantial radial alignment with the channel member, opening through the bearing rings, the adjacent wall of the channel member and the shaft to establish constant communication between the casing opening and the conduit in the shaft in all positions of rotation of the shaft with respect to the casing, a drain passage formed in the casing connecting the outer end faces of the bearing members and an opening through the casing from said drain.

2. A rotary seal device comprising a shaft having a plurality of fluid conduits extending longitudinally thereof, a casing having a bore within which one end of the shaft is rotatably mounted, a plurality of spaced solid annular bearing members secured to the wall of the bore, relatively thin bearing rings secured to the wall of the bore between said members, a plurality of annular channeled members, one for each conduit in the shaft, secured to the shaft with their channels opening toward the shaft and positioned between said bearing members, the radially inner face of each bearing member and the radially outer face of each channeled member being in bearing contact with the shaft and said bearing rings respectively, on opening through the casing in radial alignment with each channeled member, openings through the bearing rings and the adjacent wall of the channeled members maintaining constant communication between each casing opening and the channel of the channeled member aligned therewith, openings through the shaft placing the channel of each channel member in communication with one conduit in the shaft, a drain passage connecting the outer end faces of the endmost bearing members and an opening through the casing from said drain.

3. A rotary seal device as set forth in claim 2, said drain passage comprising a groove in the wall of the bore extending beyond the endmost bearing member.

4. A rotary seal device as set forth in claim 2, shallow chambers being provided at each end of the casing, one wall of each chamber being formed in part at least by the outer end face of the endmost bearing member.

5. A rotary seal device as set forth in claim 1 in which the shaft is provided with a central passage coaxial with the shaft and an opening through the bottom of the casing in axial alignment with the last named passage.

EMILE J. CARLETON.

REFERENCES CITED

The following references are of record in the file of this patent:

UNITED STATES PATENTS

| Number | Name | Date |
| --- | --- | --- |
| 1,523,822 | Marret | Jan. 20, 1925 |
| 2,187,147 | Englesson | Jan. 16, 1940 |
| 2,210,088 | Longfield | Aug. 6, 1940 |
| 2,293,585 | Bard | Aug. 18, 1942 |
| 2,343,491 | Bard et al. | Mar. 7, 1944 |